United States Patent [19]

Nishino

[11] 4,009,624
[45] Mar. 1, 1977

[54] APPARATUS FOR MENDING A PUNCTURE IN A TUBELESS TIRE

[76] Inventor: Tatuji Nishino, No. 456-4, Oaza-Yakatabara, Fukuoka, Fukuoka, Japan

[22] Filed: Aug. 6, 1975

[21] Appl. No.: 602,311

Related U.S. Application Data

[60] Continuation-in-part of Ser. No. 428,742, Dec. 27, 1973, abandoned, which is a division of Ser. No. 220,301, Jan. 24, 1972, abandoned.

[30] Foreign Application Priority Data

Jan. 28, 1971 Japan .......................... 46-3354[U]
Feb. 10, 1971 Japan ................................ 46-5728
Oct. 26, 1971 Japan .......................... 46-99863[U]

[52] U.S. Cl. ............................................. 81/15.7
[51] Int. Cl.² ........................................ B60C 25/16
[58] Field of Search ............ 81/15.7, 15.2; 152/370

[56] References Cited

UNITED STATES PATENTS

| | | | |
|---|---|---|---|
| 2,585,635 | 2/1952 | Dibble ................................. | 81/15.7 |
| 2,991,819 | 7/1961 | Lee ..................................... | 81/15.7 |
| 3,029,671 | 4/1962 | Clifford ............................... | 81/15.7 |

FOREIGN PATENTS OR APPLICATIONS 1,180,306 12/1958 France ................................ 81/15.7

*Primary Examiner*—Al Lawrence Smith
*Assistant Examiner*—Roscoe V. Parker
*Attorney, Agent, or Firm*—Wenderoth, Lind & Ponack

[57] ABSTRACT

A tire repair tool for repairing a puncture in a tubeless tire is provided. A driver tool has a driver-shaped body, the forward extremity of which constitutes an awl-like member having a groove of elliptical cross-sectional configuration. A sleeve member having a plug insertion hole is loosely fitted over the driver-shaped body. The driver-shaped body is inserted into the puncture hole until the sleeve member is fitted into the puncture hole, and then the driver-shaped body is detached so that the sleeve member alone is retained in the puncture hole. A resilient plug has unvulcanized rubber applied thereto and is inserted into the tire through the inside of the sleeve member retained in the puncture hole by the use of a plug insertion tool. The sleeve member and plug insertion tool are withdrawn from the puncture hole, thereby leaving the puncture hole filled with the resilient plug. The resilient plug is vulcanized and becomes integral with the tire.

5 Claims, 16 Drawing Figures

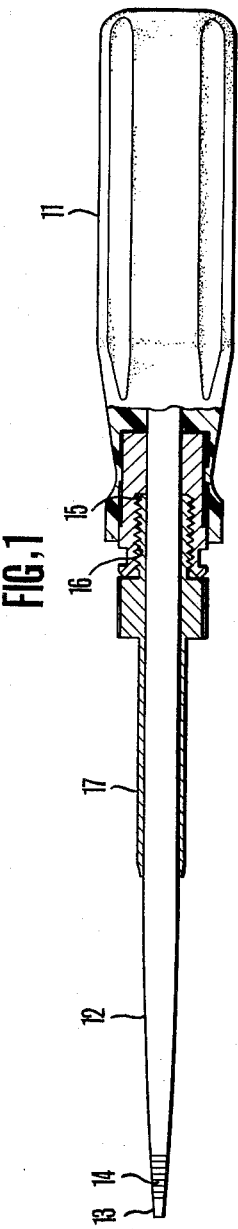
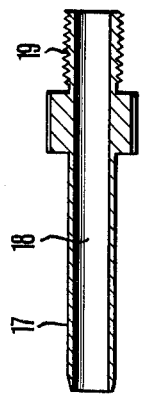
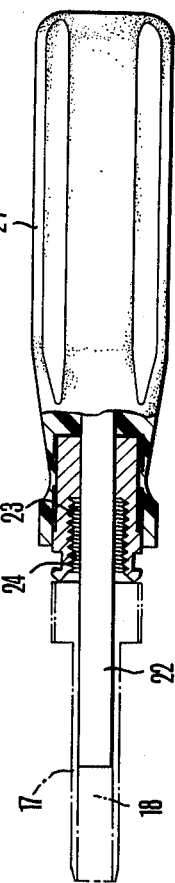

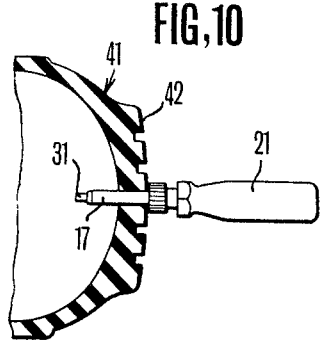
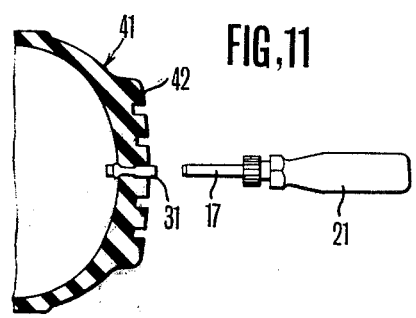

APPARATUS FOR MENDING A PUNCTURE IN A TUBELESS TIRE

This is a continuation-in-part of application Ser. No. 428,742, filed Dec. 27, 1973, now abandoned, which is a division of application Ser. No. 220,301, filed Jan. 24, 1972, now abandoned.

BACKGROUND OF THE DISCLOSURE

This invention relates to an apparatus for mending a puncture in a tubeless tire.

The known method for mending a puncture in a tubeless tire has been to apply a vulcanized adhesive or paste to the puncture hole after enlarging and molding the hole with a reamer-like cutter. A spreader with a guide shaft fitted thereto is then inserted into the puncture hole, the guide shaft alone being drawn out, and a plug is inserted into the spreader. The spreader together with the metal tube of the plug are then drawn out, the tire is inflated, and thereafter the portion of the plug that is protruding from the tire is cut off thereby completing the repair.

The plug for use in the known method has a metal tube on the outside thereof, and one end of the plug body consists of rubber shaped in the form of an umbrella. The umbrella-formed portion alone protrudes from the metal tube, and the plug is inserted into the puncture hole with such umbrella-formed portion as the forward extremity, as a result of which the puncture hole is enlarged more than necessary. Moreover, since the plug itself slides while being compressed by the tension of the tire when the metal tube guide is drawn out in the final process, the layer of the unvulcanized rubber is not perfectly brought into contact with the exterior periphery of the puncture.

When a puncture is repaired making use of the aforementioned umbrella-formed plug, the plug may be prevented from being dislocated outwardly from the tire during driving at a high speed. However, this method has the defect that the umbrella-formed plug is dislocated to the inside of the tire when the interior pressure thereof is reduced by an excessive occurrence of a standing wave phenomenon in addition to absence of progress of the vulcanization of the plug, the puncture hole thus subsequently being enlarged due to separation of the plug from the tire.

SUMMARY OF THE INVENTION

The use of the apparatus for mending a puncture in a tubeless tire according to this invention is free from the above defects. Since the plug for use with the apparatus of this invention has a layer of unvulcanized rubber on the exterior periphery thereof or consists of unvulcanized rubber, the plug is vulcanized and integrated with the tire by the heat developed therein during driving or by the use of a vulcanization accelerating agent, with the result that the plug is retained in the tire with extreme rigidity and constancy.

Moreover, since the plug is vulcanized and integrated with the tire, the puncture hole is free from the risk of being subsequently enlarged, and the separation of the tire itself is also prevented.

In addition thereto, the repair apparatus or tool of this invention enables any person not skilled in the art to readily insert a plug into a puncture hole. Moreover the use of the tool and plug enables one to repair a puncture hole even when it arises in the side or the shoulder of the tire, and particularly enables one to repair a crack-shaped puncture hole caused by a fragment of glass or the like which has hitherto been considered to be unmendable.

A first object of this invention is to enable one to repair a puncture extremely speedily and easily by simplifying the repairing operation and using a repair tool which enables any person not skilled in the art to repair the puncture with ease.

A second object of this invention is not only to prevent a plug from being dislocated but also to prevent the separation phenomenon of the tire, thereby maximizing safety during driving at a high speed through the use of a plug to which unvulcanized rubber is applied on the exterior periphery thereof or consisting of unvulcanized rubber, so that the plug will be vulcanized and integrated with the sectional surface of the tire.

A third object of this invention is to enable one to repair a puncture hole not only in a crown groove section of the tire but also in the side wall section as well as the shoulder section thereof.

These and other objects are accomplished by the parts, improvements, combinations and arrangements comprising the invention, a preferred embodiment of which is shown by way of example in the accompanying drawings, and herein described in detail. Various modifications and changes in details of construction are comprehended within the scope of the appended claims.

This invention relates to a tool for use in mending a puncture of a tubeless tire. A driver tool includes a sleeve member in which a plug insertion hole is formed and which is loosely fitted and detachably screwed into a driver-shaped body having a forward extremity formed in the shape of an awl. The driver-shaped body is inserted into the tire until the awl-formed extremity thereof reaches the inside of the tire.

The sleeve member loosely fitted into the driver-shaped body is then inserted into the puncture hole by sliding the sleeve and driver-shaped body, and the driver-shaped body is then detached with the sleeve member alone left behind in the puncture.

Through the inside of the sleeve member retained in the puncture, a resilient plug having unvulcanized rubber applied to the outside thereof is inserted into the tire making use of a plug insertion tool.

The sleeve member alone is drawn out from the puncture hole by the plug insertion tool. The resilient plug stops the puncture hole and simultaneously is prevented from dislocation from the tire as a result of integration with the tire.

BRIEF DESCRIPTION OF THE DRAWINGS

FIG. 1 is an elevational view, partially in section, of a driver tool in accordance with this invention.

FIG. 2 is an elevational section of a sleeve member loosely fitted onto the tool in FIG. 1.

FIG. 3 is an elevational view, partially in section, of a resilient plug insertion tool fitted into the inside of the sleeve member in FIG. 2.

FIGS. 4 to 11 are descriptive diagrams showing the process of stopping or repairing a puncture hole in a tubeless tire by use of the tool of the invention.

DETAILED DESCRIPTION OF THE INVENTION

Figure 4:
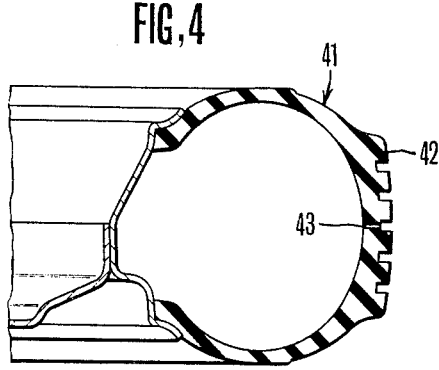

Referring now to FIGS. 1 to 3, the numeral 11 designates a driver tool which includes a driver-shaped body 12, the forward extremity thereof being formed into an awl-like member 13, a groove 14 being provided at the forward extremity thereof. The groove 14 has an elliptical cross-sectional configuration, as shown in FIGS. 12a–12e.

At the base end of the driver-shaped body 12 is formed a recess 15, female threads 16 being formed on the interior wall thereof.

The numeral 17 designates a sleeve member loosely fitted over driver-shaped body 12, 18 designating a bore for inserting a resilient plug 31 therethrough and loosely fitting the sleeve member 17 over driver-shaped body 12.

Male threads 19 are provided at the base end of the sleeve member 17, the male threads 19 detachably engaging with the female threads 16 provided at the base end of the driver-shaped body 12. The numeral 21 designates a plug insertion tool, which includes a shaft member 22 which is used to force a resilient plug 31 inserted into the sleeve member 17 into the further extremity thereof. A recess 23 is formed at the base end of the shaft member 22 as in the case of the tool 11, and female threads 24 are formed on the interior wall of the recess 23. The female threads 24 also engage detachably with male threads 19 provided at the base end of the sleeve member 17. Consequently, the sleeve member 17 is adapted to loosely fit over the driver-shaped body 12 of the tool 11 and the shaft member 22 of the tool 21, and sleeve member 17 is detachably engageable by male threads 19 at the base end thereof with the female threads 16 and 24 of the tools 11 and 21.

The embodiment illustrated in the drawing shows that the tool 11 and the tool 21 are independent of each other. However, tools 11 and 21 may be integrated by annexing the shaft member 22 and the recess 23 of the tool 21 to the opposite side of the driver-shaped body 12 of the tool 11.

FIGS. 4 to 11 show the process wherein a puncture hole 43 produced in the tread portion 42 of the tire 41 is stopped by a resilient plug 31 making use of the tools 11 and 21 and the sleeve member 17.

Figure 5:
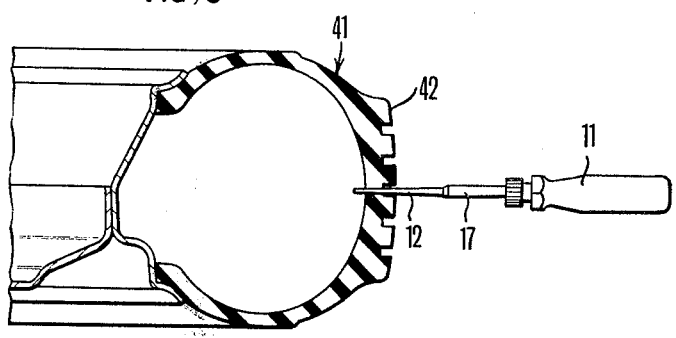

To be more precise, when a puncture arises, a nail hole (puncture hole) 43 that has caused the puncture is detected, the forward extremity of the driver-shaped member of the tool 11 over which the sleeve member 17 is loosely fitted is inserted into the crack-shaped hole according to the angle thereof until the forward extremity reaches the inside of the tire 41 as illustrated in FIG. 5.

Generally speaking, when a puncture occurs from a nail or a piece of glass, the cross-sectional shape of the puncture hole is generally football-shaped or V-shaped, and it is seldom circular shaped. Therefore it is important that the groove portion 14 and the end of member 13 of body 12 of the tool should have an elliptical cross-sectional shape for easily detecting the puncture hole and for determining the shape and radial angle of the puncture.

In this case, by inserting the driver-shaped body 12 into the puncture hole 43 with an adhesive or a vulcanization agent applied to the groove portion 14 of the driver-shaped body, if necessary, adhesion or vulcanization between the tire 41 and the resilient plug 31 which is fitted into the puncture hole is further accelerated and solidified.

Figure 6:
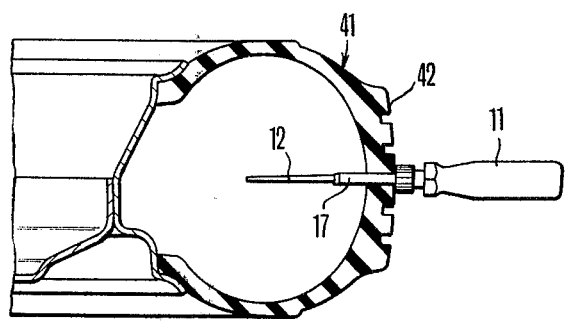
Figure 7:
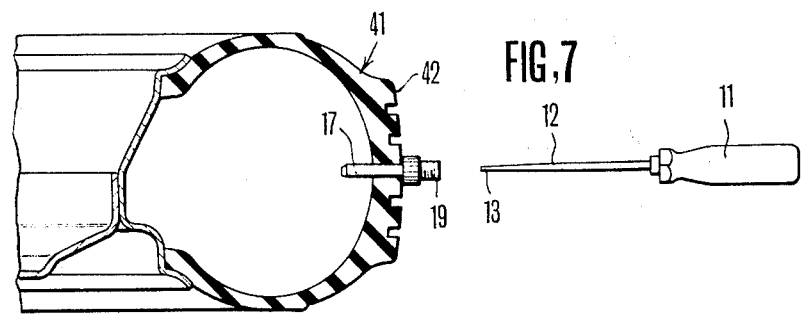

Then the driver-shaped body 12 is further inserted into the inside of the tire 41 from the position shown in FIG. 5 until the sleeve member 17 is fitted into the puncture hole 43 as shown in FIG. 6. The tool 11 having the driver-shaped body 12 is then detached from the sleeve member, thus leaving the sleeve member in the puncture hole 43 as shown in FIG. 7. The retained depth of the plug is variable by adjusting the position of the sleeve member 17, if necessary, and the length of the plug is preferably shorter than the sleeve member. The detachment of tool 11 is easily attained by releasing the engagement between the female threads 16 of the tool 11 and the male threads 19 of the sleeve member 17 as shown in FIG. 7, the sleeve member 17 alone being left in the puncture hole 43.

Figure 8:
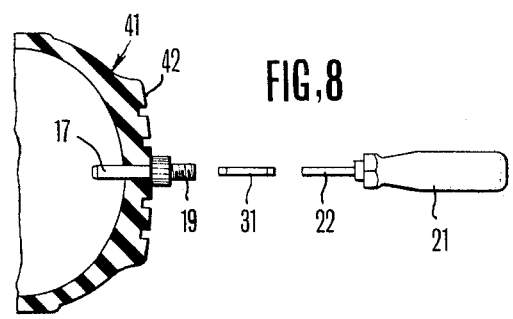
Figure 9:
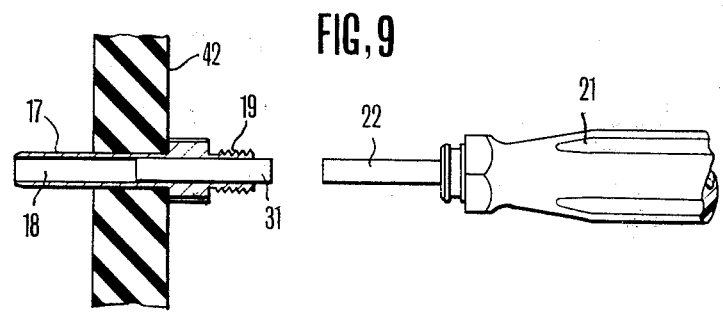
Figure 12A:
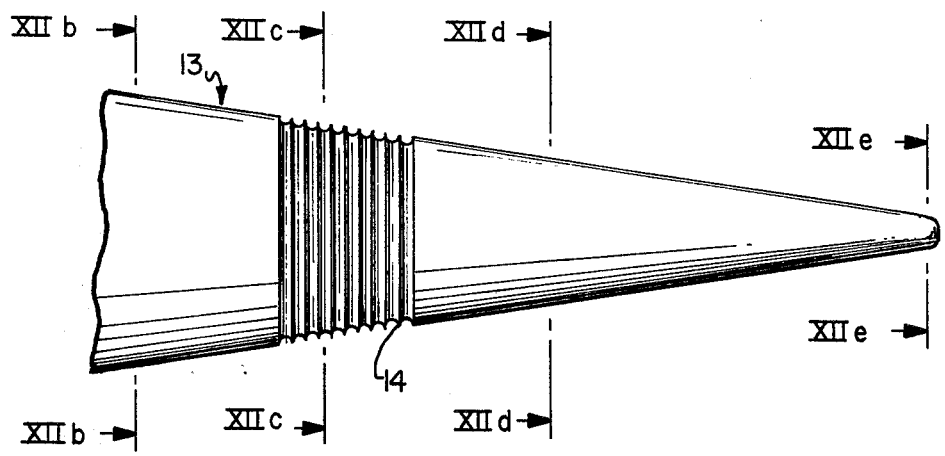
FIGS. 12a and 12b–12e are respectively a partial elevation view and transverse cross-sectional views taken along lines XIIb—XIIe of FIG. 12a of the end of the body shown in FIG. 1 and particularly illustrating the elliptical configuration thereof.
Figures 12B, 12C, 12D, 12E:
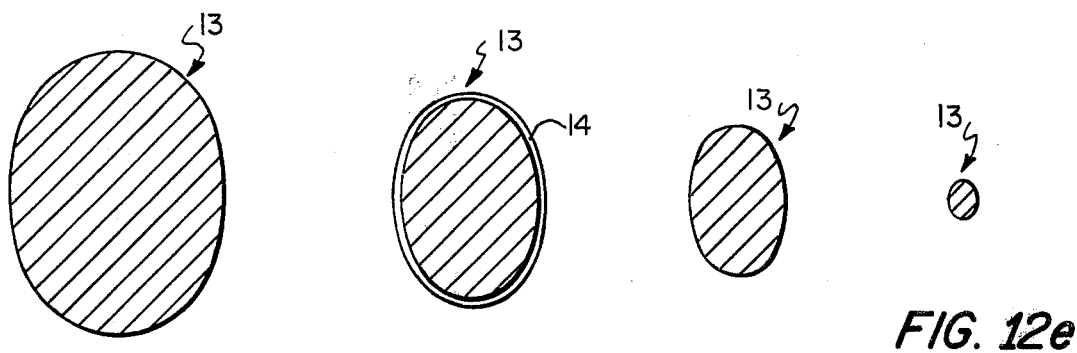

Next, the resilient plug 31 is inserted into the bore 18 of the sleeve member 17 as shown in FIGS. 8 and 9, and the resilient plug 31 is further inserted by the shaft member 22 of the plug insertion tool 21 until the forward extremity of the plug protrudes inside the tire 41 as illustrated in FIG. 10.

The shaft member 22 of the tool 21 can be sufficiently inserted into the sleeve member 17 by engaging the male threads 19 of the sleeve member 17 with the female threads 24 formed in the recess of the tool 21, as shown in FIG. 3. The length of shaft 22 is such that the end portion of the repair plug projects beyond the inner end of the sleeve member when shaft 22 it fitted into the sleeve member, and that the other end portion of the plug projects from the outer periphery of the tire after withdrawal of the sleeve member.

After the forward extremity of the resilient plug is inserted until it protrudes into the inside of the tire as shown in FIG. 10, the tool 21 is withdrawn from the tire 41, as a result of which the sleeve member 17 screwed into the tool 21 is also withdrawn, as shown in FIG. 11.

Upon withdrawal of the sleeve member 17, the puncture hole contracts, due to resiliency of the tire material, at a portion other than that where the sleeve member is retaining and holding the hole. This occurs from the inner to the outer portion of the tire thickness during withdrawal of the sleeve member, thereby retaining the plug in the puncture hole due to rubber to rubber contact friction and the plug being firmly gripped by the contracting pressure of the hole walls.

As described hereinbefore, an apparatus for mending a puncture of a tubeless tire according to this invention enables any person, even when not skilled in the art, to complete the repairing operation with accuracy and solidity in a short period of time by using the aforementioned repair tools and resilient plugs.

Though in the accompanying drawings the apparatus has been described with regard to repairing a puncture hole in the tread portion of a tubeless tire, the apparatus of this invention may also be used to repair a puncture hole arising in the side or shoulder portions of the tire by filling such puncture hole with a resilient plug according to the irregular section surface of the crack. Furthermore, the apparatus of this invention makes it possible not only to repair small holes caused by fragments of glass or the like, but also to effect parallel or overlapping insertion of plugs into the identical puncture hole, which operation has heretofore been considered to be impracticable.

What is claimed is:

1. An apparatus for use in mending a puncture in a tubeless tire, said apparatus comprising:

a driver tool having a handle and a driver-shaped body, a first end of said body being in the form of an awl-like member having an elliptical cross-sectional configuration of decreasing size toward the tip of said first end, said awl-like member having a circumferentially extending grooved portion spaced from said tip, said grooved portion having an elliptical cross-sectional configuration, a second end of said body being connected to said handle, said handle having a recess with an inner wall coaxially surrounding a portion of said body, said inner wall having female threads therein;

a sleeve member having therethrough a longitudinal bore of a size to fit over said driver-shaped body of said driver tool, said sleeve member having at one end thereof male threads of a size to engage with said female threads of said driver tool;

whereby, with said driver tool and said sleeve member coupled such that said male threads of said sleeve member engage said female threads of said driver tool and such that said driver-shaped body of said driver tool extends through said longitudinal bore of said sleeve member, said awl-like member of said driver-shaped body and then said sleeve member may be inserted into a puncture in a tubeless tire, whereafter said driver tool may be manipulated to release the engagement between the female threads thereof and said male threads of said sleeve member, said driver tool may be removed from said sleeve member, said sleeve member remaining in said puncture, and a puncture plug may be inserted into said longitudinal bore of said sleeve member; and a plug insertion tool having a handle and a shaft member, said shaft member being connected at a first end thereof to said plug insertion tool handle, said plug insertion tool handle having a recess with an inner wall coaxially surrounding a portion of said shaft member, said inner wall of said plug insertion tool having therein female threads of a size to engage with said male threads of said sleeve member, a second end of said shaft member comprising means for forcing a puncture plug further into said sleeve member, whereby said plug insertion tool may be manipulated such that said plug forcing means forces said plug further into said sleeve member, said shaft member being inserted partially into said longitudinal bore of said sleeve member, whereafter said plug insertion tool may be manipulated to engage said female threads thereof with said male threads of said sleeve member, and said plug insertion tool and said sleeve member may be pulled from said puncture, said plug remaining in said puncture, and said shaft member having a length such that when said plug insertion tool and said sleeve member are removed from said puncture said plug will have an outer end portion projecting from the outer surface of said tire.

2. An apparatus as claimed in claim 1, wherein said grooved portion comprises means for applying adhesive and vulcanizing agent to said puncture.

3. An apparatus as claimed in claim 1, wherein said sleeve member has an outer collar positioned adjacent said male threads.

4. An apparatus as claimed in claim 1, wherein said driver tool and said plug insertion tool are separate elements.

5. An apparatus as claimed in claim 1, wherein said driver tool and said plug insertion tool are integral.

* * * * *